(12) United States Patent
Lewis et al.

(10) Patent No.: US 9,681,168 B2
(45) Date of Patent: Jun. 13, 2017

(54) RECOMMENDING A COMPOSITE CHANNEL

(71) Applicant: Google Inc., Mountain View, CA (US)

(72) Inventors: Justin Lewis, Marina del Rey, CA (US); Gavin James, Los Angeles, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 15/207,184

(22) Filed: Jul. 11, 2016

(65) Prior Publication Data

US 2016/0323619 A1    Nov. 3, 2016

Related U.S. Application Data

(63) Continuation of application No. 14/680,330, filed on Apr. 7, 2015, now Pat. No. 9,392,314.

(Continued)

(51) Int. Cl.
| | |
|---|---|
| H04N 5/445 | (2011.01) |
| G06F 13/00 | (2006.01) |
| G06F 3/00 | (2006.01) |
| H04N 21/2668 | (2011.01) |
| H04N 21/24 | (2011.01) |
| H04N 21/25 | (2011.01) |
| H04N 21/258 | (2011.01) |
| H04N 21/643 | (2011.01) |
| H04N 21/61 | (2011.01) |
| H04N 21/466 | (2011.01) |
| H04N 21/482 | (2011.01) |
| H04N 21/2385 | (2011.01) |
| H04N 21/239 | (2011.01) |

(Continued)

(52) U.S. Cl.
CPC ..... *H04N 21/2668* (2013.01); *H04N 21/2385* (2013.01); *H04N 21/2393* (2013.01); *H04N 21/2407* (2013.01); *H04N 21/2408* (2013.01); *H04N 21/252* (2013.01); *H04N 21/25891* (2013.01); *H04N 21/44222* (2013.01); *H04N 21/4668* (2013.01); *H04N 21/4755* (2013.01); *H04N 21/4826* (2013.01); *H04N 21/6125* (2013.01); *H04N 21/64322* (2013.01)

(58) Field of Classification Search
CPC .................................................. H04N 21/2668
USPC ...................................................... 725/46–47
See application file for complete search history.

(56) References Cited

U.S. PATENT DOCUMENTS

| | | |
|---|---|---|
| 7,548,948 B2 | 6/2009 | Klemets et al. |
| 8,150,992 B2 | 4/2012 | Chapweske et al. |
| | (Continued) | |

OTHER PUBLICATIONS

"Now TV," Wikipedia, last modified Feb. 1, 2016, 5 pages, downloaded from https://en.wikipedia.org/wiki/Now_TV on Feb. 8, 2016.

*Primary Examiner* — Hunter B Lonsberry
(74) *Attorney, Agent, or Firm* — Lowenstein Sandler LLP

(57) ABSTRACT

Recommending channels is disclosed. A method for recommending a channel includes identifying multiple component channels of a content platform. The method further includes generating a user interest score for the user for each of the component channels. The method further includes defining a composite channel that includes a subset of the component channels. The method further includes providing a recommendation to the user to subscribe to the composite channel.

20 Claims, 9 Drawing Sheets

Related U.S. Application Data

(60) Provisional application No. 61/976,474, filed on Apr. 7, 2014.

(51) Int. Cl.
*H04N 21/442* (2011.01)
*H04N 21/475* (2011.01)

(56) References Cited

U.S. PATENT DOCUMENTS

| | | |
|---|---|---|
| 9,392,314 B1 * | 7/2016 | Lewis ............... H04N 21/2668 |
| 2002/0199182 A1 | 12/2002 | Whitehead |
| 2005/0207336 A1 | 9/2005 | Choi et al. |
| 2008/0049786 A1 | 2/2008 | Ram et al. |
| 2008/0270446 A1 * | 10/2008 | Gossweiler ....... G06F 17/30867 |
| 2011/0299544 A1 | 12/2011 | Lundgren et al. |
| 2012/0066338 A1 | 3/2012 | Asarikuniyil et al. |
| 2012/0212575 A1 | 8/2012 | Chen et al. |

* cited by examiner

RECOMMENDING A COMPOSITE CHANNEL

CROSS-REFERENCE TO RELATED APPLICATION

The present application is a continuation of U.S. patent application Ser. No. 14/680,330, filed Apr. 7, 2015, which claims the benefit of U.S. Provisional Application No. 61/976,474 entitled, "RECOMMENDING A COMPOSITE CHANNEL," filed Apr. 7, 2014, each of which is incorporated herein by reference.

TECHNICAL FIELD

Implementations of the present disclosure relate to providing media content, and more specifically, to recommending a composite channel.

BACKGROUND

Online content sharing platforms typically allow users to upload, view, and share digital content such as media items. Media items may include audio clips, movie clips, TV clips, music videos, images, or other multimedia content. Users may use computing devices (such as smart phones, cellular phones, laptop computers, desktop computers, netbooks, tablet computers) to use, play, and/or otherwise consume media items (e.g., watch digital videos, and/or listen to digital music). Media items can be provided to a user through channels. A channel may include content available from a common source, or content having a common subject or theme.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one aspect, a method includes identifying a plurality of component channels of a content platform. The method further includes generating, by a processing device, a user interest score for the user for each of the plurality of component channels. The method further includes defining a composite channel that includes a subset of the component channels. The user interest score for each component channel in the subset of the component channels exceeds a predetermined threshold. The method further includes determining a recommendation event for the composite channel. The method further includes upon detecting the recommendation event, providing a recommendation to the user to subscribe to the composite channel.

In implementations, the user interest score indicates an affinity of the user for each of the plurality of component channels. Generating the user interest score for the user for each of the plurality of component channels can include determining a predicted amount of consumption of the user for each of the respective component channels within a period of time. The recommendation event can include activity of the user in relation to at least one of the component channels can included in the composite channel. The at least one of the component channels can be a channel to which the user can has previously subscribed. Each of the plurality of component channels can include an associated individual subscription price. The method can include determining a composite channel subscription price that can be different than a sum of each individual subscription price for each of the component channels included in the composite channel. The plurality of component channels can include a first set of channels, a second set of channels and a third set of channels. Defining the composite channel can include selecting one channel from the first set of channels. The method can further include selecting one channel from the second set of channels. The method can further include selecting one channel from the third set of channels. The method can include receiving a request from the user to subscribe to the composite channel.

In one aspect, a method includes determining, by a processing device, a recommendation event for recommending a composite channel to a user. The method further includes identifying, by the processing device, a plurality of component channels pertaining to the recommendation event. The method further includes generating, by the processing device, a user interest score for the user for each of the plurality of component channels. The method further includes defining a composite channel that includes at least two of the component channels. The user interest score for each component channel in the subset of the component channels can exceed a predetermined threshold. The method further includes providing a recommendation to the user to subscribe to the composite channel.

In implementations, the recommendation event can include an activity of the user that can be related to consumption of a media item in a content platform. The activity of the user pertains to consumption of a media item that can be associated with a component channel to which the user has previously subscribed. The at least two of the component channels can be each related to the activity of the user.

In additional implementations, computing devices for performing the operations of the above described implementations are also disclosed. Additionally, in implementations of the disclosure, a computer readable storage media stores methods for performing the operations of the above described implementations.

BRIEF DESCRIPTION OF THE DRAWINGS

The present disclosure is illustrated by way of example, and not by way of limitation, in the figures of the accompanying drawings.

DETAILED DESCRIPTION

Figure 1:
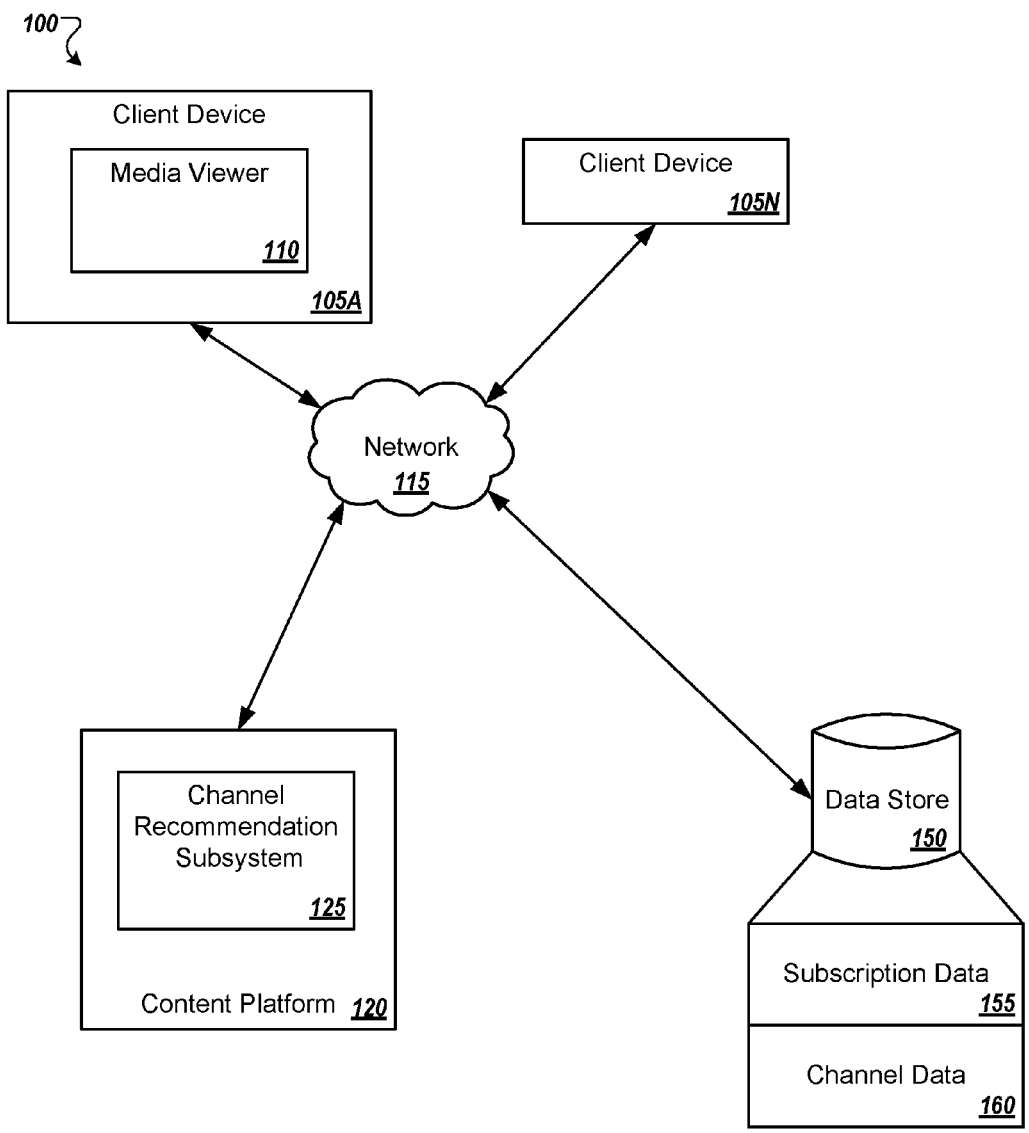
FIG. 1 illustrates an example system architecture, in accordance with one implementation of the disclosure.

The following disclosure sets forth numerous specific details such as examples of specific systems, components, methods, and so forth, to provide an understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely examples. Particular implementations may vary from these example details and still be contemplated to be within the scope of the present disclosure.

Conventional media providers sometimes offer bundles of channels to individuals. Often, the bundles include popular content along with unpopular content. For example, cable television providers often provide bundles of television channels where a subscriber may only watch a small percentage of the channels within the bundle. Individuals that subscribe to these bundled channels are typically frustrated with paying for channels and content they have no desire to consume.

Aspects of the present disclosure address these and other shortcomings of conventional systems by providing bundled content that may be personalized to an individual user or subset of users. Further, the present disclosure permits recommending these individualized bundles of content to the individual user or subset of users. For example, a content platform may identify four channels (e.g., channels A, B, C and D) that may be of interest to a user. To determine whether a channel is of interest to the user, the content platform may identify past, present or predicted activities of the user and/or other users (e.g., users that may be similar to the user). The content platform may bundle the four channels A, B, C and D and may recommend the bundle to the user. Each of the four channels A, B, C, and D may have an individual subscription price. The price the user can pay to subscribe to the bundle can be less than a total price of individually subscribing to each channel.

Implementations of the disclosure pertain to generating a recommendation to subscribe to a composite channel (e.g., bundle) associated with a content platform. A content platform can be any platform that facilitates content uploading, content sharing and feedback among various entities (e.g., individuals, organizations, etc.) and/or content curation. The content platform may provide content over one or more networks, including private networks, public networks, the Internet, television networks, radio waves, etc. In some implementations, the content platform is internet-based. Entities are collectively referred to herein as users. A channel can be data content available from a common source or data content having a common topic or theme. In implementations, a channel can be a source for feed items that can be presented in a user feed. A user feed may refer to a collection of items that are produced and/or offered through a channel. The user feed can include real-time information of activities associated with channels to which the user is subscribed. Media items that are available to a user (e.g., through a subscription to the channel, without the user subscribing to the channel) can be syndicated to and stored on a user feed. A channel can be associated with a curator who can perform management actions on the channel. A channel curator may refer to an entity (e.g., an individual, an organization or a system) that can perform management actions (e.g., adding/removing media items, defining subscription prices, etc.) on the channel. The channel curator may also be authorized to receive revenues associated with the channel. A channel curator can be a professional content provider (e.g., a professional content creator, a professional content distributor, a content rental service, a television (TV) service, etc.) or an amateur individual. The channel content can be digital content uploaded to the content platform by the channel curator and/or digital content selected by the channel curator from the content available on the content platform. Channel content can include professional content (e.g., movie clips, TV clips, music videos, educational videos) and/or amateur content (e.g., video blogging, short original videos, etc.). Users, other than the curator of the channel, can subscribe to one or more channels in which they are interested. The content platform can include multiple channels that are created or curated by different channel curators. Users can pick and choose the channels they want, unlike conventional television and cable providers, where users obtain access to content as part of a non-personalized bundle.

Each channel may include one or more media items. Examples of a media items can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc., media items comprising at least one of a video item, an audio item, an image, a blog entry, a tweet, a social network post, an online publication, a software program, or an online video game. A media item can also include live-streamed content and content available on-demand. As used herein, "content," "content item," "media," media item," "online media item," "digital media," and a "digital media item" can include an electronic file that can be executed or loaded using software, firmware or hardware configured to present the digital media item to an entity. A media item may be consumed via a web browser and/or via a mobile device application. For brevity and simplicity, an online video (also hereafter referred to as a video) is used as an example of a media item throughout this document.

The content platform may include composite channels. A composite channel is a channel that includes at least one individual ("component") channel along with additional content (e.g., another component channel). A component channel and/or a composite channel can be a paid channel that can be offered as a paid subscription. A paid subscription may require a recurring payment for temporary access to an experience on the content platform. Individual paid channels can be available for purchase "a la carte" (i.e., standalone) or as part of a package (e.g., as part of a composite channel). A composite channel may also be referred to as a "package," a "channel package," "a bundle," and/or a "package of channels." As the term is used herein, "channel" or "channels" can collectively refer to component channels and composite channels. The composite channel can be associated with a channel curator. In some implementations, the composite channel is a compilation of channels from multiple channel curators and is not specifically associated with any particular channel curator. In such implementations, the composite channel can be associated with and managed by a content platform.

FIG. 1 illustrates an example network architecture 100 in which embodiments of the present disclosure can be implemented. The network architecture 100 includes client devices 105A through 105N, a network 115, a content platform 120 and a data store 150. In one implementation, network 115 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) or LTE-Advanced network), routers, hubs, switches, server computers, and/or a combination thereof. In one implementation, the data store 150 may be a memory (e.g., random access memory), a cache, a drive (e.g., a hard drive), a flash drive, a database system, or another type of component or device capable of storing data. The data store 150 may also include multiple storage components (e.g., multiple drives or multiple databases) that may also span multiple computing devices (e.g., multiple server computers).

The client devices 105A through 105N may each include computing devices such as personal computers (PCs), laptops, mobile phones, smart phones, tablet computers, netbook computers, e-readers, personal digital assistants (PDA), or cellular phones etc. While only client devices 105A-105N are shown in FIG. 1, network architecture 100 may support a large number of concurrent sessions with many client devices 105.

Each client device 105A through 105N includes at least one media viewer 110 that allows a user to subscribe to channels (e.g., component, composite) and view content and media items of the channels. For example, the media viewer 110 may be a web browser that can present a list of subscribable channels to the user. As a web browser, the media viewer 110 can also access, retrieve, present, and/or navigate content (e.g., web pages such as Hyper Text Markup Language (HTML) pages, digital media items, etc.) served by a web server. As discussed above, the channels of the content platform 120 may include single channels and/or composite channels that may include multiple component channels (e.g., multiple channels). The media viewer 110 may render, display, and/or present the list of subscribable channels and associated content to the user. The media viewer 110 may also provide channel recommendations (e.g., a recommendation to subscribe to a channel). The media viewer 110 may also provide an embedded media player (e.g., a Flash® player or an HTML5 player) that is embedded in a web page (e.g., a web page that may provide information about a product sold by an online merchant). In another example, the media viewer 110 may be a standalone application (e.g., a mobile application or mobile app) that allows users to subscribe to channels and consume digital media items (e.g., digital videos, digital images, electronic books, etc.). The media viewer 110 may be provided to the client devices 105A through 105N by the content platform 120. For example, the media viewer 110 may be a browser that provides a media player that is embedded in a web page provided by the content platform 120. In another example, the media viewer 110 may be an application that is downloaded from an application distribution platform, such as an "app store." (not shown).

Client devices 105A through 105N may also be used by channel curators to define and manage one or more channels of the content platform 120. In one embodiment, the media viewer 110 may be an application that allows a channel curator to manage one or more channels of the content platform 120. For example, the content platform 120 may provide a web interface for channel curators to define and manage their channels. The media viewer 110 may be a web browser that channel curators may use to access the web interface to allow the channel curators to manage their channels. In another example, media viewer 110 may be an application (e.g., a mobile app) that communicates with the content platform 120 and allows channel curators to define and manage their channels in the content platform 120.

The content platform 120 may include one or more computing devices, such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components.

The content platform 120 may provide digital content (e.g., digital video, streaming video, images, digital music, streaming music, social media information, etc.) to one or more of the client device 105 and may allow users to share content among multiple users. To provide digital content, for example, the content platform 120 may allow a user to subscribe to a paid or free channel. The content platform 120 may present different types of access or different subscriptions levels to the user. The content platform 120 can also allow the user to consume, upload, search for, curate, share, approve of ("like"), dislike, and/or comment on media items of various channels.

The content platform 120 may create and manage end user channel subscriptions (e.g., for component and composite channels) and may provide content to end users. The content platform 120 may also allow channel curators to create and manage channels and identify media items to associate with channels.

The content platform 120 may include a channel recommendation subsystem 125 that can create a channel and recommend that channel to a user. For example, the channel recommendation subsystem 125 can create a composite channel that includes multiple component channels and then recommend the composite channel to a user. The content platform 120 and the channel recommendation subsystem 125 can interact with the client device 105, such as via the media viewer 110, to communicate data between the content platform 120 and channel curators/end users. The channel recommendation subsystem 125 can be implemented on a single server, a cluster of servers, a cloud, etc.

In embodiments, the channel recommendation subsystem 125 identifies component channels to include in a composite channel. Each of the component channels can have an associated individual subscription price (e.g., free, paid). The individual subscription prices can be any price or amount. The channel recommendation subsystem 125 can identify an interest level for a user for each channel in a set of component channels. The channel recommendation subsystem 125 can quantify the interest level of the user by generating a user interest score. In implementations, the channel recommendation subsystem 125 can generate a user interest score for the user for each channel within the set of channels. Using the user interest scores, the channel recommendation subsystem 125 can define a composite channel that includes one or more of the identified component channels. In implementations, the channel recommendation subsystem 125 selects components channels with a user interest score that exceed a predetermined threshold for inclusion in the composite channel. The channel recommendation subsystem 125 can determine when to recommend the composite channel to the user. In implementations, the channel recommendation subsystem 125 can determine a recommendation event for the composite channel. Upon detecting the recommendation event, the channel recommendation subsystem 125 can provide a recommendation to the user to subscribe to the composite channel. Features and operations of the channel recommendation subsystem 125 are further described in conjunction with FIGS. 2-4.

Data store 150 may include any combination of subscription data 155 and channel data 160. Subscription data 155 may include subscription data for users that have subscribed to channels identified in channel data 160 (e.g., registered users of a content platform). The subscription data 155 may include channels that a user has subscribed to, subscription levels for channels the user has subscribed to, selected types of access, selected advertising attributes, etc.

Channel data 160 may include identification information for various channels, such as an identifier of the channel (e.g., name), one or more identifiers (e.g., names) of content or media items associated with the channel, a list of media items in each channel, and/or whether individual media items in the channel are free or paid, etc. Channel data 160 can be used by the content platform 120 to generate a list of channels to present to users. The channel data 160 can be created based on input from a channel curator (e.g., subscriber fees for a channel, media item groups, etc.). For a composite channel, channel data 160 may also include identifiers of one or more component channels associated with the composite channel. The channel data 160 may also include data indicative of an interest of a user in a channel (e.g., a user interest score), which can be determined by the channel recommendation subsystem 125, as described in further detail in conjunction with FIG. 2. The data indicative of an interest of a user can also relate to a probability of the user to subscribe to a channel, which can include data content that the user has liked, topics the user is interested in, information about others users who are similar to the user, affinity data for a user to one or more component channels, etc.

The channel data 160 may also include recommendation data for each component channel and composite channel. For example, channel data 160 may also include recommendation events and rules to present a recommendation to subscribe to a channel upon a detection of a recommendation event, as described in further detail in conjunction with FIG. 2. In some implementations, the recommendation data is stored in association with a related composite channel. In one embodiment, the channel data 160 may also include prices for composite channels and component channels. For example, the channel data 160 may indicate a price (fixed or dynamic) for including a channel in a composite channel.

In some embodiments, data store 150 is deployed across one or more datacenters. A datacenter is a facility used to house a large number of storage devices. Data in data store 150 may be replicated across the multiple datacenters in order to provide reliability, availability, and scalability (RAS) features and/or to allow fast load times for the presentation of content on the content hosting website. The manner of replication of data may be selected by a user, may be selected based on one or more replication algorithms, etc.

During operation of system 100, a user accesses the content platform 120 via client/user device 105 over network 115. The user can navigate the content platform 120 to discover content and channels through keyword searching, browsing recommended channels, identifying other users' activity, such as by viewing channels or media items shared by others, or a combination thereof. Users can also discover content and channels through advertisements and recommendations presented within the content platform 120. As the user navigates content, the content platform 120 can generate recommended content based on the activity of the user, as described in further detail in conjunction with FIG. 2. In implementations, the content platform 120 monitors the activity of the user (e.g., page views, likes, comments, shares, subscriptions, media item views, etc.) and can store the monitored activity in data store 150. The content platform 120 can use the monitored activity to provide meaningful channel recommendations to the user. For example, when a user watches more rock music videos than videos from any other genre, the content platform 120 can recommend channels to the user that include rock videos.

In response to a channel recommendation, the user can subscribe to the channel. After creating a subscription for the user, the content platform 120 can record the user subscription as subscription data 155 of data store 150. In one implementation, when the user subscription is recorded, the content platform 120 allows the user to immediately (e.g., in real time) consume media items of the channel. The user can also immediately (e.g., in real time) view his or her subscriptions from a user home GUI of the content platform 120.

Although each of the content platform 120 and data store 150 are depicted in FIG. 1 as single, disparate components, these components may be implemented together in a single device or networked in various combinations of multiple different devices that operate together. Examples of devices may include, but are not limited to, servers, mainframe computers, networked computers, process-based devices, and similar type of systems and devices.

In situations in which the systems discussed herein collect personal information about users, or may make use of personal information, the users may be provided with an opportunity to control whether the content platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content platform 120. In embodiments of the disclosure, the content platform 120 notifies users of the types of information that are stored in data store 150, and provides the users the opportunity to choose not to have such information collected, analyzed, and/or shared.

Figure 2:
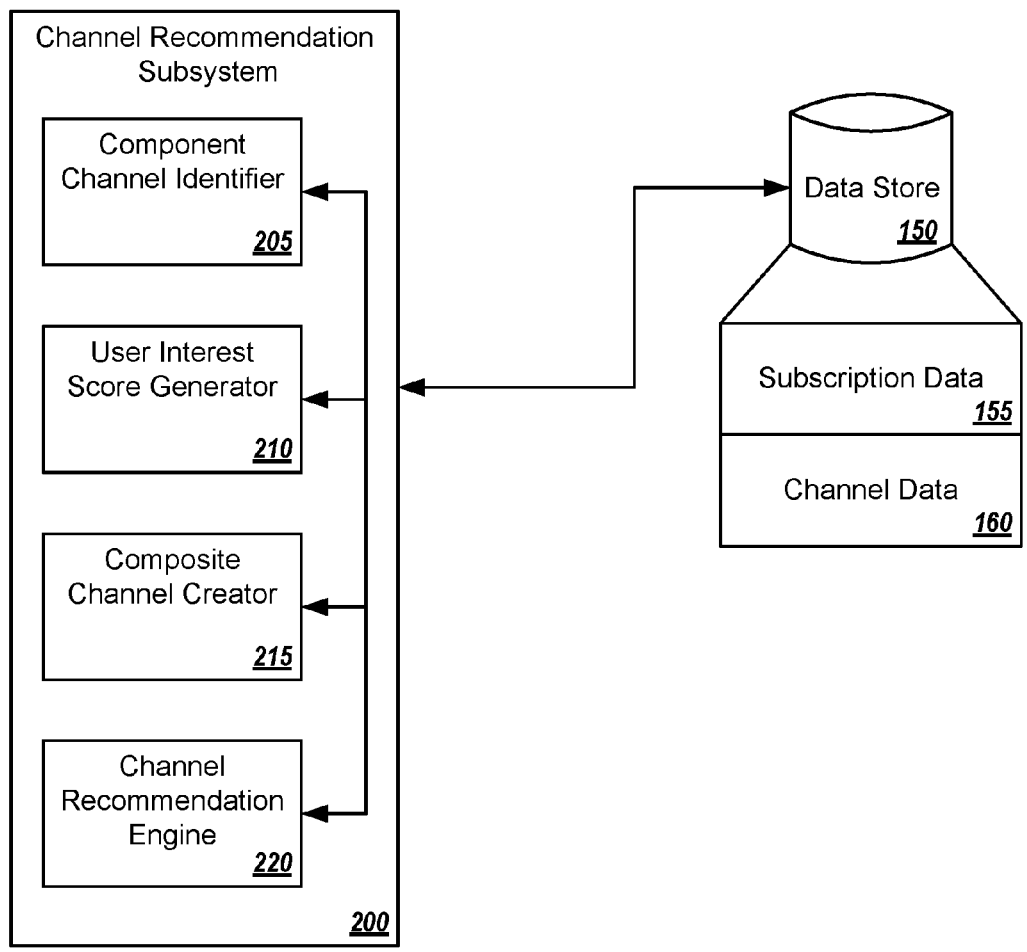
FIG. 2 is a block diagram illustrating a channel recommendation subsystem, in accordance with some implementations of the present disclosure.

FIG. 2 is a block diagram illustrating a channel recommendation subsystem 200, in accordance with some embodiments of the present disclosure. The channel recommendation subsystem 200 may be the same as the channel recommendation subsystem 125 of FIG. 1 and may include a component channel identifier 205, a user interest score generator 210, a composite channel creator 215, and a channel recommendation engine 220. More or less components may be included in the channel recommendation subsystem 200 without loss of generality. For example, some components may be combined into a single component, or any component may be divided into two or more components. In one implementation, one or more of the components may reside on different computing devices (e.g., different server computers).

The channel recommendation subsystem 200 is communicatively coupled to the data store 150. For example, the channel recommendation subsystem 200 may be coupled to the data store 150 directly or via a network (e.g., via network 115 as illustrated in FIG. 1). The data store 150 includes subscription data 155 and channel data 160, as discussed above in conjunction with FIG. 1.

The component channel identifier 205 may determine one or more component channels that may be of interest to a user for possible inclusion in a composite channel. The component channel identifier 205 can use characteristics and activities of the user when identifying component channels that may be of interest to the user. In implementations, the component channel identifier 205 can use past or current actions of the user (e.g., activity of the user with respect to content items) to identify component channels. For example, the component channel identifier 205 may identify a baseball-related component channel for a user who frequently watches baseball-related videos. The past actions can also include channel subscriptions. For example, when a user has subscribed to multiple hockey-related channels, the component channel identifier 205 may identify another hockey-related channel to which the user has not yet subscribed as being of interest to the user. In an example of using current user actions to identify a component channel, the user may navigate to a channel page while browsing content within a media sharing platform, such as the content sharing platform 120 of FIG. 1. The component channel identifier 205 may identify such a channel as being of interest to the user. In some implementations, an affinity score between the user and a component channel can be used to identify whether the component channel is of interest to the user. In implementations, the affinity score can indicate a level of interest a user has with respect to a component channel. In some implementations, the affinity score can indicate a likelihood of the user to subscribe to a composite channel that includes the component channel. The affinity score may be calculated using explicit actions that a user takes in association with the content of the component channel (e.g., clicking, liking (providing a positive feedback), commenting, tagging (assigning an identifier to a piece of information), sharing, subscribing, etc.). These actions can be stored as channel data 160 of data store 150 on a per-channel basis. For example, a user that regularly interacts with robot-themed content may have a high affinity for such robot-themed content. The component channel identifier 205 may generate a high affinity score between the user and a robot-themed channel to which the user has not yet subscribed in light of the user's regular interactions with robot-themed content. The component channel identifier 205 may generate affinity scores between the user and any number of channels. In implementations, the component channel identifier 205 may then rank the affinity scores of multiple channels. In some implementations, the composite channel identifier 205 can predict an amount of time that a user may spend consuming content from a component channel, such as for a particular time period, which can be referred to as "predicted watch time."

In some embodiments, the component channel identifier 205 can use characteristics and actions of other users to identify a component channel of interest to a user. The component channel identifier 205 can identify other users that have consumed similar media, or subscribed to the same types of channels (e.g., within a same genre or category), etc. For example, user A has many characteristics in common with a group of users B-F. In this example, users A-F are male users within a same age range (e.g., between 25-35) and consume similar content (e.g., extreme sports-related content). Users B-F have subscribed to channel X, but user A has not. Because of the similarities between the users A-F, the component channel identifier 205 can infer that user A may also be interested in channel X. As such, the component channel identifier 205 can identify channel X as being of interest to user A.

Once the component channel identifier 205 determines one or more component channels that may be of interest to a user for possible inclusion in a composite channel, the component channel identifier 205 may create a list of the identified channels and provide the list to the user interest score generator 210. In implementations, the component channel identifier 205 stores the list in data store 150 as channel data 160. The list can identify any number of channels and can include any information or characteristics about the channels and users (e.g., genre, number of subscribers, user affinity score for each channel, user likelihood to subscribe to a composite channel that includes a component channel, actual watch time, predicted watch time, activity of other similar users, etc.).

The user interest score generator 210 quantifies an interest level of a user with respect to a channel (e.g., a predicted interest level, a quantifiable actual interest level). In implementations, the user interest score generator 210 determines a user interest score for each channel (e.g., component, composite) in a content sharing platform 120 (FIG. 1). The user interest score can be an indicator of relevancy or potential interest of a particular channel to a user. Channels with a higher user interest score may indicate they are (or could be) more valuable, interesting or relevant to a particular user than other channels with lower user interest scores.

To determine the user interest score, the user interest score generator 210 can identify one or more factors that indicate user interest. These factors can include any information or characteristics about any component channel/or and user that relates to determining relevancy of a channel for a user, such as the information or characteristics identified by the component channel identifier 205, as described above. Example factors include, but are not limited to a predicted consumption of content associated with the component channel, an actual consumption of content associated with the component channel, an activity of a user, an activity of other users who are similar to the user, an affinity between a subscriber and the component channel, or a total amount of content produced by the component channel. Any number of factors might be assigned numbers that are combined to generate the user interest score. In some implementations, the factors are added or multiplied together to obtain the user interest score. In an example, user interest score generator 210 can use predicted consumption of content (e.g., watch time) associated with the component channel to calculate user interest scores for two different component channels. The first channel can have more predicted watch time than the second channel, which gives the first channel a higher user interest score than the second channel. Because the first channel has a higher user interest score, it may be of interest to the user, at least more so than the second channel. To determine a user interest score for the composite channel, the user interest score generator 210 can aggregate user interest scores for multiple component channels in the composite channel.

In an example using multiple factors to generate user interest scores, a first component channel might generate three hours of watch time per month for a user (i.e., the user watches three hours of content of the component channel per month) and a second component channel in the composite channel might generate four hours of watch time per month for the user but the user's interest score for the first channel might be twice as high as the second because the user likes, comments on, and shares every video associated with the first channel.

In some implementations, some of the factors may be more important than other factors. The user interest score generator 210 may assign a weight to a factor that is more important than another. The user interest score generator 210 may also assign weights to multiple factors, with more important factors receiving higher weights than lesser important factors. For example, a predicted watch time may have more importance than how many times a user likes content from the channel. In this example, a first weight may be associated with watch time and a second weight may be associated with the user's likes.

In some implementations, one factor that may influence the user interest score can include a price to subscribe to the component channel. In some implementations, the subscription price of a component channel directly affects the user interest score (e.g., a higher subscription price can increase the user interest score). In some implementations, the subscription price of a component channel inversely affects the user interest score (e.g., a higher subscription price can decrease the user interest score).

After creating a user interest score for a user for a channel, the user interest score generator 210 can record the user interest score as channel data 160 of data store 150. In some implementations, the user interest score generator 210 can append the user interest score to the list of channels generated by the component channel identifier 205.

The composite channel creator 215 defines a composite channel that includes multiple component channels that may be of interest to the user. In embodiments, the composite channel creator 215 accesses the list of component channels provided by the component channel identifier 205 and/or the user interest scores created by the user interest score generator 210 when defining a composite channel, such as by accessing the channel data 160 in data store 150. In some embodiments, the composite channel creator 215 can define a composite channel using all of the component channels included in the list. In some implementations, the composite channel creator 215 may define a composite channel using a subset of the component channels included in the list. For example, the composite channel creator 215 may use the first five channels in the list to define a composite channel. In implementations, the composite channel creator 215 can define a composite channel based on the user interest scores of the included component channels. For example, the composite channel creator 215 can define the composite channel to include five component channels with the top user interest scores. In some implementations, the composite channel creator 215 defines composite channels based on a topic, category, genre, cluster of users, or other similar grouping factor. For example, composite channel creator 215 can define a sports composite channel that includes sports-related component channels. In another example, the composite channel creator 215 defines a composite channel for a user M based on activities of other similar users, as described herein. In another example, the composite channel creator 215 can identify one or more social clusters in a social graph. A social cluster can be a group of users that share a common characteristic. Each of user in the social cluster can create, provide, and/or share content with other users in the social cluster. When one user, who is not part of the social cluster, interacts with multiple other users in that social cluster then the composite channel creator 215 may define a composite channel which includes content generated by anyone in the social cluster. In this example, the users in the social cluster are the component channels.

In some implementations, the composite channel creator 215 can identify groups of channels, and then select component channels from the groups for inclusion in the component channel. The groups of channels can include both component channels and composite channels. For example, the composite channel creator 215 can identify three groups of component channels (e.g., robots, fast-food commercials from the 80's, and skiing) that User A is interested in consuming (e.g., User A can spend 90% of his time watching videos from these three groups). The composite channel creator 215 can select a subset of component channels from each group (e.g., the component channel with the highest user interest score from each group) for inclusion in the composite channel (e.g., one robot channel, one fast-food commercials from the 80's channel, and one skiing channel).

In some implementations, the composite channel creator 215 can define a composite channel that is specific and personalized to a single user (e.g., only that user may subscribe to the composite channel). In some implementations, the composite channel creator 215 can define a composite channel that is available to a group of users.

The channel recommendation engine 220 provides a recommendation to a user to subscribe to a channel. The channel recommendation engine 220 can recommend a channel to a user based on contextual relevance to the user. For example if a user is about to subscribe to a particular component channel, then channel recommendation engine 220 may recommend that the user subscribe to a composite channel that includes that component channel they were about to subscribe to. In implementations, the composite channel may include a set of channels that other users who have subscribed to the component channel also watch. In another example a user might already have a paid subscription for a component channel. After the user has interacted regularly with the content provided by the component channel, the channel recommendation engine 220 may recommend that the user upgrade the individual subscription to the component channel to a subscription to a composite channel that includes the component channel and other similar component channels. The channel recommendation engine 220 can use more than one channel as the contextual input when generating a recommendation for a user. For example if a user is already subscribed to three component channels, the channel recommendation engine 220 may create a recommendation that suggests that the user should replace the subscriptions to the three individual component channels with a composite channel that include those three component channels and possible others.

The channel recommendation engine 220 can determine one or more recommendation events for the user to define contextual relevance for a particular recommendation. A recommendation event can relate to any activity of the user, such as what the user is presently doing, content the user is presently consuming, a webpage that the user is currently viewing, etc. The recommendation event can include activity of the user in relation to at least one of the component channels included in a composite channel. For example, a recommendation event can be when a user watches a shark video that is included in a shark-themed component channel.

The channel recommendation engine 220 can also define one or more rules that define a relationship between a detected recommendation event and the subsequent provision of a recommendation to subscribe to a channel. The rules can define one or more actions to take upon detecting a recommendation event that is triggered by the user. In implementations, a rule can be an instruction to present a recommendation to subscribe to a particular component channel upon detecting a particular recommendation event. For example, using the above example where the recommendation event is when a user watches a shark video, a corresponding rule can be an instruction to provide a recommendation to the user to subscribe to a shark-themed composite channel to which the user has not yet subscribed. In another example, a recommendation event can be when a user is browsing a webpage associated with a component channel and the rule can be an instruction to provide a recommendation to the user to subscribe to a composite channel that includes the component channel. In yet a further example, a recommendation event can be when a user has subscribed to at least one component channel that is included in a composite channel Z and the rule can be an instruction to provide a recommendation to the user to subscribe to the composite channel Z at any time (or periodically) while the user is browsing/consuming content within a content platform 120 (FIG. 1).

In implementations, the channel recommendation engine 220 can use the user interest score to recommend a composite channel to a user. For example, the recommendation event can be any event while the rule can be to provide a recommendation to the user to subscribe to a composite channel with the highest aggregate user interest score. For example, an event can be a page load and a rule can be to recommend the composite channel with the highest user interest score. As described above, a user interest score for a composite channel can be determined by aggregating the individual user interest scores of the composite channels included in the component channel. User interest scores for multiple composite channel can be determined and stored as channel data 160 of data store 150.

In some implementations, a rule can be to first define or create a composite channel based on an activity of a user and then to provide a recommendation to subscribe to the composite channel to the user. The recommendation event can be any user activity. For example, while a user watches a video (recommendation event) related to basejumping, the channel recommendation subsystem 200 can rule can be to define a composite channel, using the techniques described herein, that is related to extreme sports. Then, the newly defined composite channel can be recommended to the user while the user is still watching the basejumping video.

In embodiments, the channel recommendation engine 220 can use various criteria when defining rules on when to provide a recommendation to the user to subscribe to a composite channel. The various criteria can be related to the activity of the user, the composite channel and some or all of the component channels that are included in the composite channel. Examples of the various criteria may include, but are not limited to, a subject matter of a composite channel (e.g., sports, movies, art, etc.), a subscription fee or price for a composite channel, a number of component channels in a composite channel, a number of subscribers to a composite channel, geographic availability of a composite channel (e.g., a composite channel or package may be offered in certain countries), demographics of subscribers to a composite channel (e.g., age, gender, etc.), a name for a composite channel, etc.

In implementations, the channel recommendation subsystem 200 may periodically determine a dynamic user interest score for the user for a particular channel. In some embodiments, the channel recommendation subsystem 200 determines and/or updates the user interest score for each component channel after a user has subscribed to the composite channel. Such user interest score can also include factors relating to actual consumption of content for each component channel. For example, a composite channel can include five channels A-E. A month after the user subscribed to the composite channel, the channel recommendation subsystem 200 can identify actual watch time for the user for each composite channel. The channel recommendation subsystem 200 can use the actual watch time to determine the user interest score for each composite channel.

In another example, the channel recommendation subsystem 200 may determine a dynamic user interest score for a channel based on the user's interaction with content of the particular channel. For a composite channel, as the user's activity increases or decreases, so can the dynamic user interest score of the user for the composite channel. For component channels that are part of a composite channel, as a user interest score for a component channel decreases beyond a threshold amount, the channel recommendation subsystem 200 can remove that component channel from the composite channel. In some implementations, when a component channel is removed from a composite channel, the channel recommendation subsystem 200 can identify a component channel to add to the composite channel, using techniques described herein. In some implementations, the channel recommendation subsystem 200 can add or remove component channels from a composite channel at any time and for any reason.

In some implementations, the channel recommendation subsystem 200 can use normalization techniques when determining a user interest score. For example, using the example above, each channel A-E begins with a same minimum value, such as 1. Then, a value score is calculated for each channel A-E and the minimum value is added to the each value score. By adding a minimum value of 1 to the percentages from above, channel A would have a user interest score of 1.2, channels B-C would be 1, channel D would be 1.1 and channel E would be 1.7. Normalization can also be used when one component channel has a significantly higher user interest score then the other component channels (e.g., 99 for one channel, and 0.2 for five other channels).

Figure 3A:
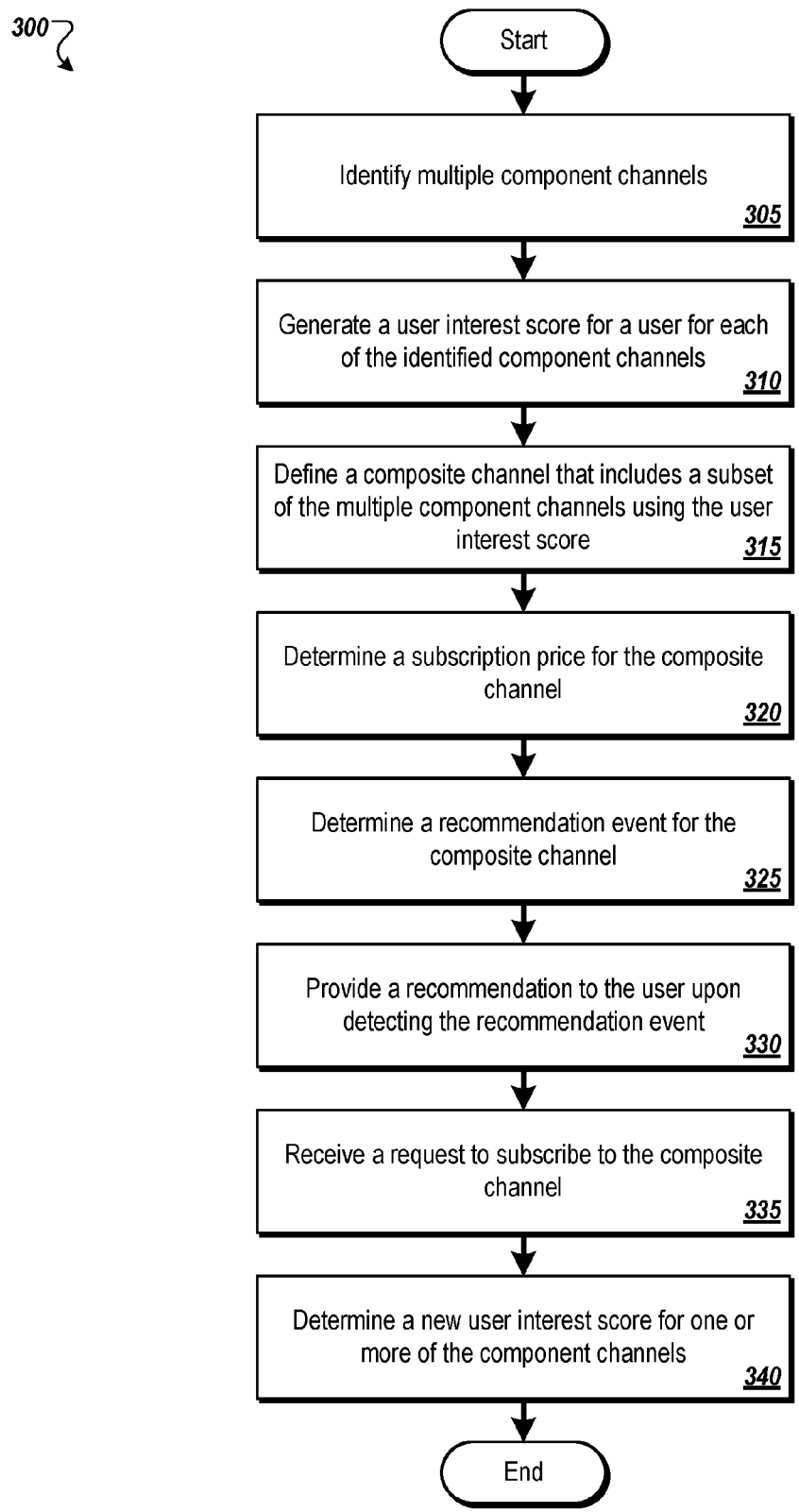
FIGS. 3A-B are flow diagrams illustrating methods of recommending a composite channel, in accordance with some implementations of the present disclosure.
Figure 3B:
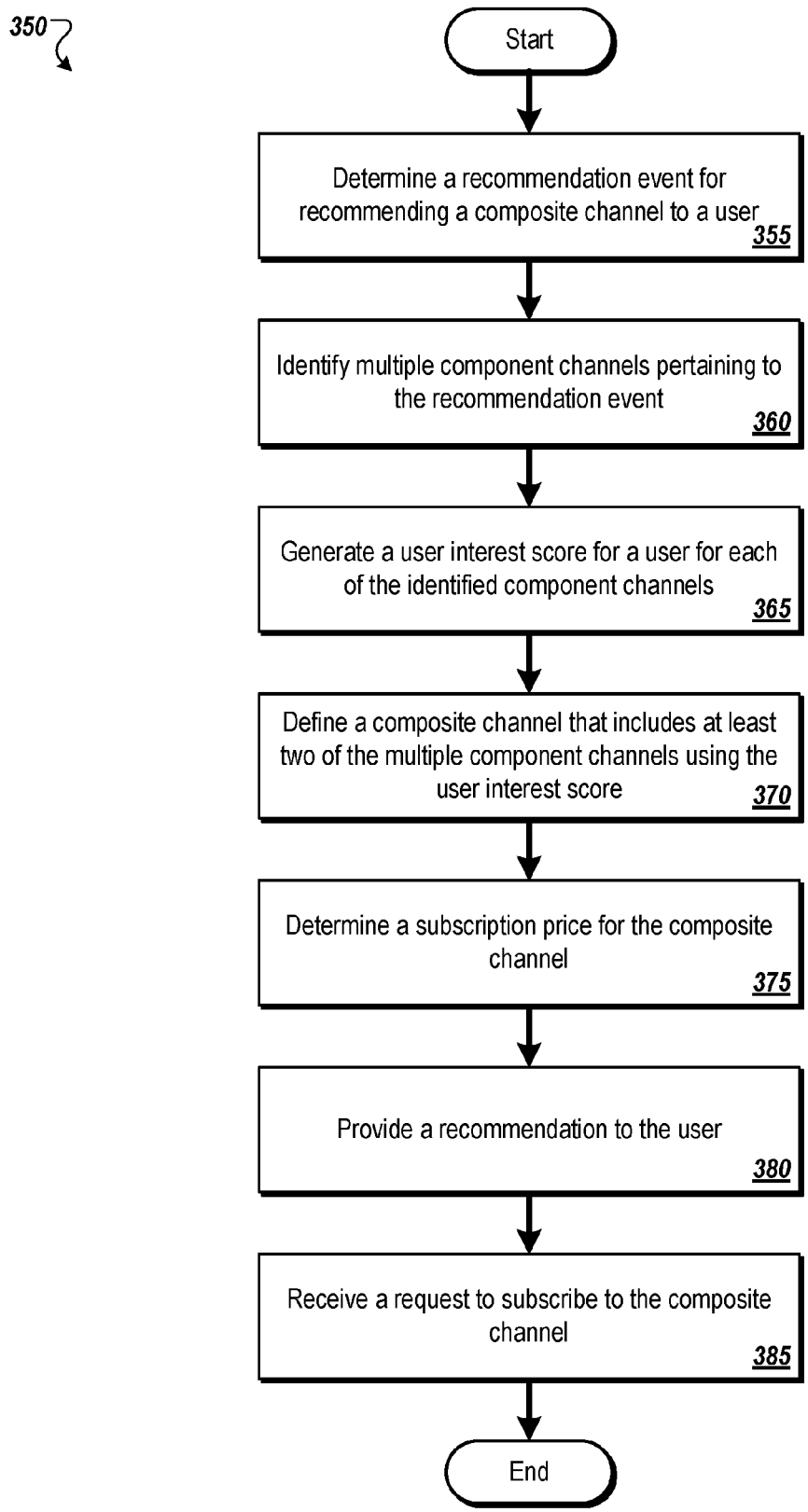
Figure 4:
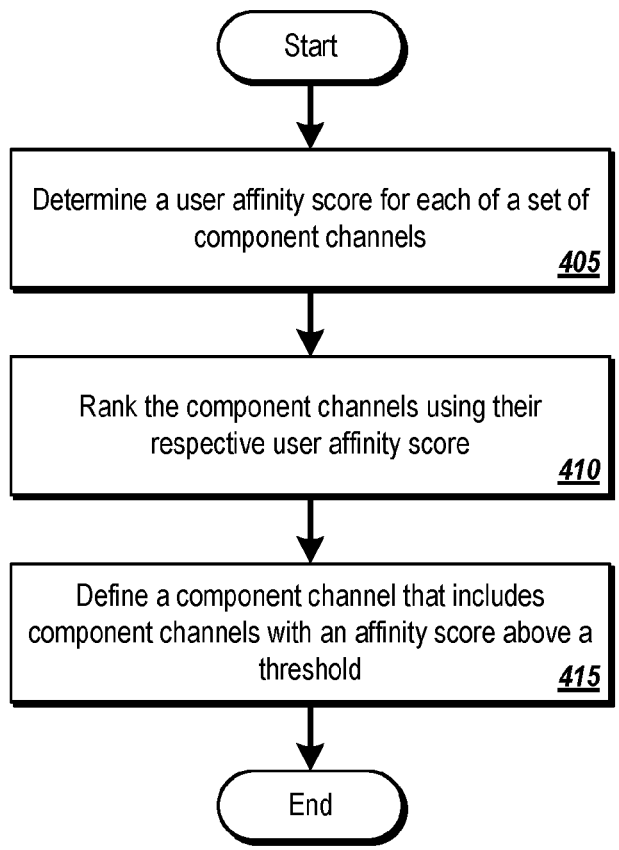
FIG. 4 is a flow diagram illustrating a method of defining a composite channel to recommend to a user, according to some implementations of the disclosure.

FIGS. 3-4 are flow diagrams illustrating methods for performing various operations, in accordance with some embodiments of the present disclosure, including providing recommendations for channels in a content platform. The methods may be performed by processing logic that comprises hardware (e.g., circuitry, dedicated logic, programmable logic, microcode, etc.), software (e.g., instructions run on a processor to perform hardware simulation), or a combination thereof. Processing logic can control or interact with one or more devices, applications or user interfaces, or a combination thereof, to perform operations described herein. When presenting, receiving or requesting information from a user, processing logic can cause the one or more devices, applications or user interfaces to present information to the user and to receive information from the user.

For simplicity of explanation, the methods of FIGS. 3-4 are depicted and described as a series of operations. However, acts in accordance with this disclosure can occur in various orders and/or concurrently and with other operations not presented and described herein. Further, not all illustrated operations may be required to implement the methods in accordance with the disclosed subject matter. In addition, those skilled in the art will understand and appreciate that the methods could alternatively be represented as a series of interrelated states via a state diagram or events.

FIG. 3A is a flow diagram illustrating a method 300 of providing a recommendation for a channel in a content platform, in accordance with some embodiments of the present disclosure. In one implementation, method 300 may be performed by a channel recommendation subsystem 200, as illustrated in FIG. 2.

Referring to FIG. 3A, the method 300 begins at block 305 where processing logic identifies multiple component channels that may be of interest to one or more users for possible inclusion in a composite channel. Each of the component channels may have an associated individual subscription price.

At block 310, the processing logic can generate a user interest score for the user for each of the component channels. The processing logic can use characteristics and activities of the user when generating the user interest score for the user for each of the component channels. In implementations, the processing logic can use past or current actions of the user (e.g., activity of the user with respect to content items) to generate the user interest score, as described herein. In some implementations, the processing logic can use characteristics and actions of other users to identify a component channel of interest to a user, as described herein. In implementations, when generating the user interest score for the user for each of the component channels, the processing logic determines a predicted amount of consumption of the user for each of the respective component channels within a period of time. In implementations, the user interest score indicates an affinity of the user for each of the component channels, as described in further detail in conjunction with FIG. 4.

At block 315, the processing logic defines a composite channel that includes a subset of the component channels, as described herein. In implementations, the user interest score for each component channel in the subset of the component channels exceeds a predetermined threshold. In one implementation, the composite channel includes a first set of channels, a second set of channels and a third set of channels. In this implementation, when defining the composite channel, the processing logic selects one channel from the first set of channels, selects one channel from the second set of channels, and selects one channel from the third set of channels. The composite channel can include any number of component channels and any number of sets of component channels.

At block 320, the processing logic can optionally determine a composite channel subscription price. In some implementations, the processing logic determines the subscription price for a composite channel by adding together the individual subscription prices for the component channels. In some implementations, the composite channel subscription price is different than a sum of each individual subscription price for each of the component channels included in the composite channel. In implementations, the composite channel subscription price may be less than a sum of individual subscription prices for the component channels.

At block 325, the processing logic determines a recommendation event for the composite channel. In implementations, the recommendation event can include activity of the user in relation to at least one of the component channels included in the composite channel. In some implementations, the user has subscribed to at least one of the component channels included in the composite channel. Alternatively, the user has subscribed to none of the component channels included in the composite channel at the time of the determining the recommendation event.

At block 330, the processing logic provides a recommendation to the user to subscribe to the composite channel upon detecting the recommendation event.

At block 335, the processing logic can receive a request to subscribe to the composite channel.

At block 340, the processing logic can determine a new user interest score (or update an existing user interest score) of the user for one or more of the component channels. The processing logic can periodically redefine the user interest score. For example, the processing logic can determine an initial user interest score for each component channel around the time of defining the composite channel. Later, the processing logic can determine an updated user interest score using various criteria (e.g., an affinity between a subscriber and each of the component channels, and/or the same or different criteria as those used to define the initial user interest score). In implementations, the processing logic determines an updated user interest score once. Alternatively, the processing logic can periodically determine an updated user interest score. In some implementations, the processing logic can determine an updated user interest score after the occurrence of a predefined event (e.g., when there is a change in a number of subscribers to the composite channel, when an amount of watch time exceeds a threshold, etc.).

FIG. 3B is a flow diagram illustrating a method 350 of providing a recommendation for a channel in a content platform, in accordance with some embodiments of the present disclosure. In one implementation, method 350 may be performed by a channel recommendation subsystem 200, as illustrated in FIG. 2.

Referring to FIG. 3B, the method 350 begins at block 355 where processing logic determines a recommendation event for recommending a composite channel to a user. The event can be an activity of the user that is related to consumption of a media item in a content platform. For example, the activity can be the user's viewing of a hockey-related video. In some implementations, the activity of the user can pertain to consumption of a media item (e.g., the hockey video) that is associated with a component channel to which the user has previously subscribed (e.g., the user has already subscribed to a channel that includes the hockey video). Alternatively, the activity of the user can pertain to consumption of a media item that is associated with a component channel to which the user has not previously subscribed (e.g., a hockey video provided by a channel to which the user has not previously subscribed and/or is about to subscribe).

At block 360, the processing logic identifies multiple component channels that may pertain to the recommendation event (e.g., hockey-related component channels). Each of the component channels may have an associated individual subscription price.

At block 365, the processing logic can generate a user interest score for the user for each of the component channels. As described herein, the processing logic can use characteristics and activities of the user when generating the user interest score for the user for each of the component channels. In implementations, the processing logic can use past or current actions of the user (e.g., activity of the user with respect to content items, the recommendation event) to generate the user interest score, as described herein. In some implementations, the processing logic can use characteristics and actions of other users to identify a component channel of interest to a user, as described herein. In implementations, when generating the user interest score for the user for each of the component channels, the processing logic determines a predicted amount of consumption of the user for each of the respective component channels within a period of time. In implementations, the user interest score indicates an affinity of the user for each of the component channels, as described in further detail in conjunction with FIG. 4.

At block 370, the processing logic defines a composite channel that includes two or more of the component channels, using techniques described herein. In implementations, the user interest score for each of the two or more component channel exceeds a predetermined threshold. In some implementations, the at least two of the component channels are each related to the recommendation event and/or activity of the user.

At block 375, the processing logic can optionally determine a composite channel subscription price. In some implementations, the processing logic determines the subscription price for a composite channel by adding together the individual subscription prices for the component channels. In some implementations, the composite channel subscription price is different than a sum of each individual subscription price for each of the component channels included in the composite channel. In implementations, the composite channel subscription price may be less than a sum of individual subscription prices for the component channels. In some implementations, if the composite channel includes one or more component channels to which the user has previously subscribed or is about to subscribe, the revenues allocated for those channels will not be reduced when those channels are included in the composite channel, but the revenues allocated for additional channels included in the composite channel will be lower as compared to the revenue allocated for those channels when they are offered as stand-alone individual channels.

At block 380, the processing logic provides a recommendation to the user to subscribe to the composite channel. At block 385, the processing logic can receive a request to subscribe to the composite channel.

In some implementations, the processing logic can determine multiple recommendation events for the user. For example, the processing logic can determine a first recommendation event for recommending a composite channel (e.g., when the user watches hockey-related videos) and a second recommendation event (e.g., when the user watches Winter Olympics-related videos).

FIG. 4 is a flow diagram illustrating a method 400 of defining a composite channel using affinity scores, in accordance with some embodiments of the present disclosure. In one implementation, method 400 may be performed by a channel recommendation subsystem 200, as illustrated in FIG. 2.

Referring to FIG. 4, the method 400 begins at block 405, where the processing logic determines a user affinity score for each of a set of component channels. At block 410, the processing logic ranks the component channels using their respective user affinity score. At block 415, the processing logic defines a composite channel that includes component channels with an affinity score above a threshold.

Figure 5:
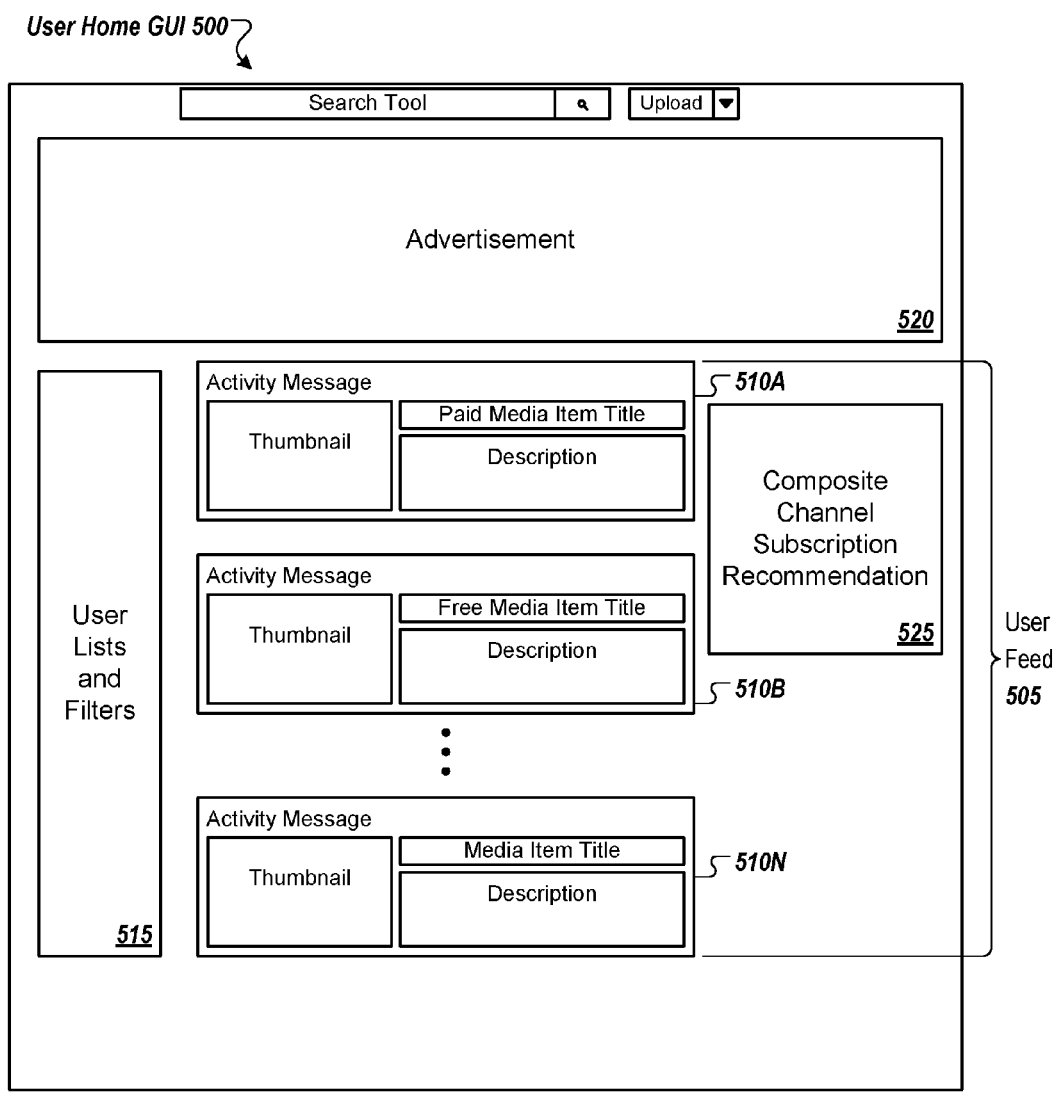
FIGS. 5-7 illustrate example graphical user interfaces (GUI), according to some implementations of the disclosure.
Figure 6:
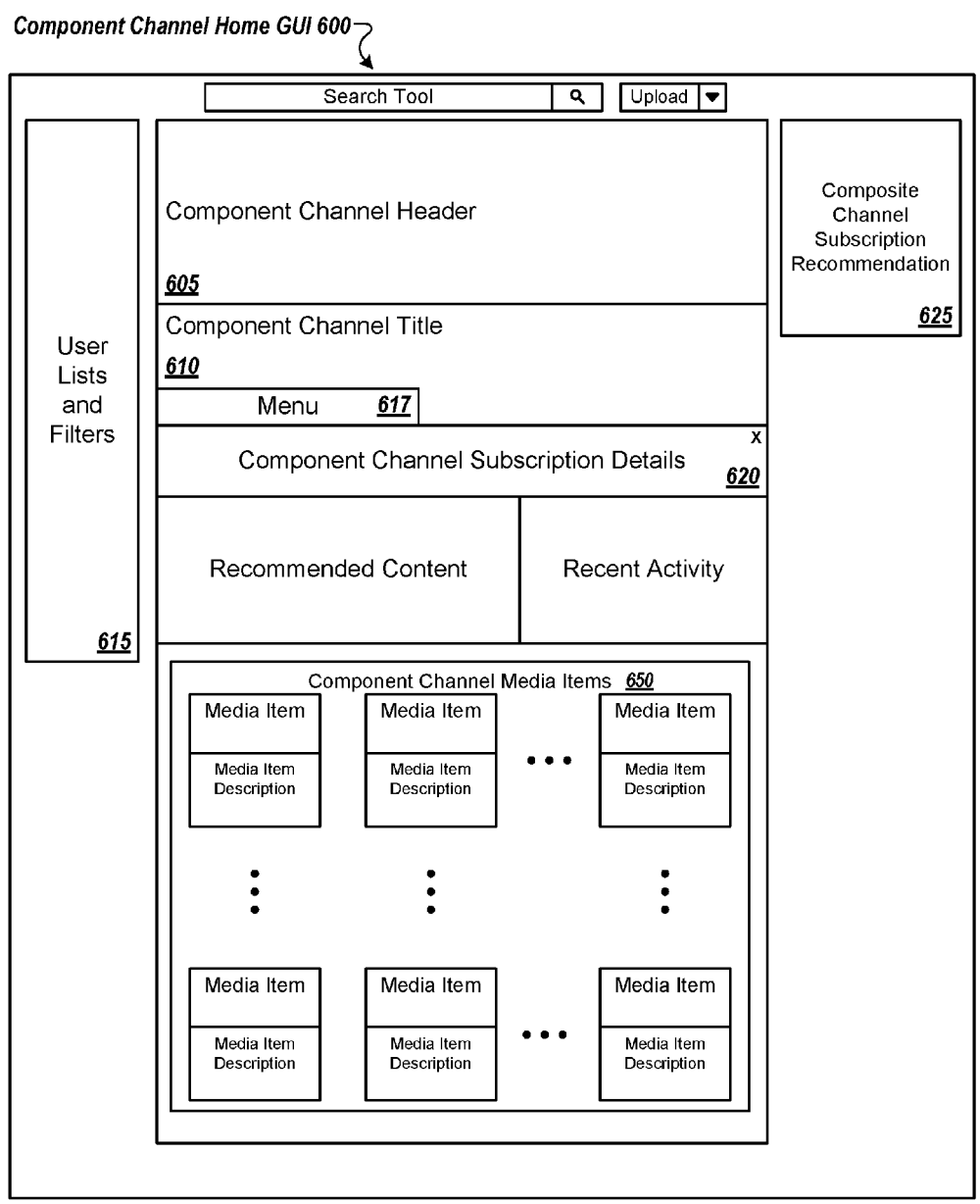
Figure 7:
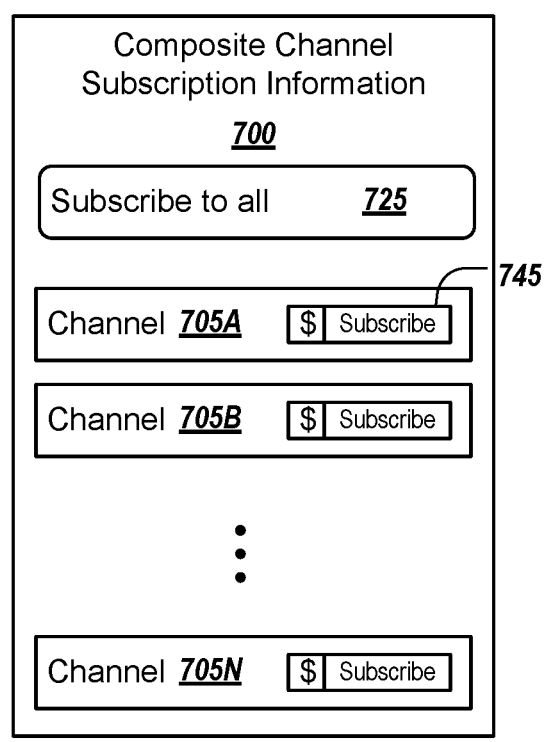

FIGS. 5-7 illustrate example graphical user interfaces (GUI) in accordance with aspects of the present disclosure. The example GUIs may be presented by and/or displayed within a web browser when the user accesses the content platform via the web browser. In an embodiment, the example GUIs may be an interface presented by a media viewer (e.g., an app, an application, a program, a software module/component, etc., that may be used to subscribe to channels and view, play, and/or consume media items of the channels). Some example GUIs include control elements in the form of a button (e.g., a button for subscribing to a channel). However, it should be noted that various other control elements can be used for selection by a user such as a check box, a link, or any other user interface elements.

As shown, some example GUIs contain a search tool (e.g., to search for a channel or media item of interest), an upload tool (e.g., to upload a new media item to a content platform), a menu (e.g., to navigate to different GUIs of the content platform), a user identifier, a settings tool (e.g., to configure settings of GUIs of the content platform), and a navigation tool for navigating to other platforms (e.g., an email platform, a social platform, a storage platform, an image platform, a calendar platform, among others).

FIG. 5 is an example user home (e.g., homepage) GUI 500 in accordance with some embodiments of the present disclosure. The user home GUI 500 can include a user feed 505, user lists and filters 515, an advertisement 520 and composite channel subscription information 525.

The user feed 505 can include information of activities associated with channels to which the user is subscribed. When the user subscribes to a channel (e.g., paid, free) or connects with a social contact, the content platform may provide the user with new media items (e.g., new content) to consume and/or provide the user with access to media items. For example, media items from subscribed channels (e.g., paid, free) may be displayed on the user feed 505. It should be understood that any type of activity or feed information from any source or other entity may be shown in the user feed 505. For example, an image (e.g., a JPEG) may be shown in the user feed 505. In another example, digital music (e.g., an MP3) may be played in the user feed 505. In yet another example, social media information (e.g., a tweet, a like, etc.) may be shown in the user feed 505. In a further example, blog information (e.g., a blog post, etc.) may be shown in the user feed 505.

The information of activities of others (e.g., channels, social contacts, celebrities, etc.) can be presented as one or more user feed items 510A-510N. The user feed items 510A-510N can include an activity message, a thumbnail or frame of a media item, a media item title, and a description of the media item. In one embodiment, the user feed items 510A-510N can include information about the most recent activities associated with each channel (e.g., content uploaded to the channel, etc.), as well as a mechanism for the user to perform an action for that activity (e.g., providing a frame or thumbnail of the content uploaded to the channel that serves as a link to the content). A user feed item 510A can include an activity message that "Channel A uploaded a video," as well as a thumbnail or frame of the video which the user can activate to view the new video. Another user feed item 510B can include an activity message that "Channel B added five videos to a playlist," as well as the playlist, which can include links to the videos added to the playlist. When a curator of a channel, for example, adds a new media item to the paid channel, a new user feed item 510 that introduces the new item to the user can be added to the user feed 505. This new user feed item 510 can be added to the user feed 505 in real-time (as soon as the curator of the channel provides the new media item to be added to the channel). Similarly, when the curator of the channel removes an existing media item from a channel, any corresponding existing user feed items 510 can be removed from the user feed 505 in real time. When a user is unsubscribed from a channel, the content platform can also prevent media items of the channel from appearing in the user feed 505.

The user lists and filters 515 can be a list of one or more channels (free or paid) that may be of interest to the user.

The user lists and filters 515 can also include a guide that helps the user to discover content that may be of interest. For example, user lists and filters 515 can include a section for what to watch, what media items are popular on the content platform, what media items social contacts of the user have been consuming, etc. The user lists and filters 515 can also include links to help the user to see their watch history and what media items they have marked for later consumption.

The advertisement 520 can be an advertisement that may be presented anywhere on the user home GUI 1500 for each user of the content platform. The advertisement 520 includes one or more media types, such as text, audio, video and an image. To facilitate driving traffic, the advertisement 520 can include one or more hyperlinks that direct users to an internet property, such as a component channel GUI, as described in conjunction with FIG. 6. The advertisement 520 can also encourage subscriptions to a channel and can include a subscribe button that enables a user to subscribe to a channel from the advertisement 520. The advertisement 520 can be any type of advertisement, such as a display advertisement, a banner advertisement, a video advertisement, etc. In implementations, they can include subscription information for a composite channel.

The composite channel subscription information 525 can be used to inform users of content and channels that may be of interest to the user. In one implementation, the composite channel subscription information 525 can include a list of one or more channels, as described in further detail in conjunction with FIG. 7. The composite channel subscription information 525 can be presented anywhere on user home GUI 500. In implementations, a recommendation to subscribe to a channel (e.g., composite, component) can be presented as composite channel subscription information 525. The recommendation can be generated for a specific user, as described here. The recommendation can also be presented to the user as composite channel subscription information 525 in response to a recommendation event, such as the user interacting with a feed item (e.g., watching a particular video within the feed), as described herein.

FIG. 6 illustrates an example component channel home GUI 600 in accordance with some implementations of the present disclosure. The component channel home GUI 600 can showcase media items offered through the component channel and can encourage a user to subscribe to the component channel and/or to one or more composite channels that include the component channel. The component channel home GUI 600 can also disseminate information to users about the channel, media items of the channel or any other information the channel curator chooses to make available on the channel home GUI 600. When the channel home GUI 600 is for a paid channel, it can present information to users about subscribing to the paid channel. For example, the channel home GUI 600 can showcase interesting media items that are accessible through a paid subscription to the paid channel. Additionally, the channel home GUI 600 can present different subscription fees, durations, and subscription options, such as paying for different advertising attributes of the paid channel, or for different types of access to media items of the paid channel. Using the information presented by the channel home GUI 600, the user can make an informed purchasing decision.

The channel home GUI 600 can include a channel header 605, a channel title 610, a menu 617, channel subscription details 620, channel subscription information 625, one or more channel media items 750, user lists and filters 615, and composite channel subscription information 625.

The channel header 605 can describe the channel, media items of the channel, or can be a promotion for the channel. The channel header 605 can be an image or text that is selected by the channel curator.

The menu 617 can enable user to navigate to different channel GUIs, such as a home GUI, a browse GUI, a channel feed GUI, a media item GUI, an about GUI, a discussion GUI, or a channel search GUI.

Channel subscription details 620 can specify benefits for subscribing to the paid channel. Channel subscription details 620 can also include promotions or trial periods for the channel. Channel subscription details 620 can further include metadata of the channel, such as created by metadata, channel description and channel statistics. The statistics can include a number of people who have subscribed to the paid channel, aggregate statistics across other channels, a number of media items in the paid channel, etc.

Composite channel subscription information 625 can present one or more composite channels that include the component channel that is associated with GUI 600. The composite channel subscription information 625 can be used to inform users of content and channels that may be of interest to the user. In one implementation, the composite channel subscription information 625 can include a list of one or more channels, as described in further detail in conjunction with FIG. 7. In implementations, the composite channel subscription information 625 can be used to drive users from subscribing to the component channel individually to subscribing to the composite channel that includes the component channel, as depicted in the composite channel subscription information 625. In some implementations, the component channel featured in the channel home GUI 600 is a channel with which the user has not subscribed. In other implementations, the user has previously subscribed to the component channel featured in the channel home GUI 600. The composite channel subscription information 625 can be presented anywhere on component channel home GUI 600.

The channel home GUI 600 can also include one or more media items 650. The media items can be organized in any manner and the organization can help users locate interesting media items. Media items can be organized in different categories, such as recent uploads, popular uploads, likes, playlists, parodies, original videos, reposts, or other categories. In one implementation, a channel curator defines some or all of the categories and organizes media items of the channel within the categories. When a channel curator adds or uploads a media item to the channel, the new media item can be presented as part of the paid channel immediately after the channel curator adds the new media item to the paid channel. Users that are browsing the channel may observe the addition of the new media in real time. Similarly, when the channel curator remove an existing media item from the paid channel, the existing media item can be removed from the channel home GUI 600 in real time. In another implementation, users can organize, filter and sort media items by category, upload date, number of views, number of likes, number of dislikes, paid, free, etc.

Some of the media items can be viewable for free, even if the media items are part of a paid channel. Users can watch these media items even if they have not subscribed to the paid channel, which can be a way for the user to sample content of the paid channel before committing to paying for access. In another implementation, one or more media items of the paid channel can be available for individual purchase within the channel for users who have not subscribed to the paid channel. Such media items can have an identifier 635 to inform the user that the media item can be purchased on an individual basis. In this manner, the user can choose between renting or purchasing a single media item or subscribing to a whole channel that includes the media item.

The channel home GUI 600 can also include one or more advertisements. The advertisement can present channels or media items that are related to the channel depicted in the channel home GUI 600.

FIG. 7 illustrates one example of a composite channel subscription information GUI 700 that includes a title or description of the composite channel, a number of included component channels (e.g., two additional channels), information for at least some of the component channels 705 included in the composite channel, different subscriber fees and subscription durations (e.g., $2.99/month or $43.99/year), a type of access (e.g., offline access), an advertising attribute (e.g., no advertising), and a number of other users subscribed to the composite channel (e.g., 15,098,198). In implementations, some composite channels are free and composite channel subscription information 725 and does not include price information. Some free composite channels include information that they are free of charge. Channel subscription information interface 700 also includes a "subscribe to all" button 725. The subscribe button 725 can be selected by a user to subscribe to the composite channel. In some implementations, when a user subscribes to the composite channel, the user also is subscribed to each component channel. In implementations, the GUI 700 includes individual subscribe buttons 745 associated with each channel 705. A user can select the individual subscribe button to selectively subscribe to one or more component channels 705 individually.

In one implementation, a user may become subscribed to a composite channel after the user subscribes to a threshold number of component channels. For example, the user is a subscriber of four component channels, each of which has a $0.99/month subscriber fee. A composite channel that includes these four component channels, as well as three additional component channels and a few premium media items, can all be available through a composite channel with a subscriber fee of $2.99/month. The content platform can automatically subscribe the user to the composite channel and notify the user of the additional component channels and premium media items that are now available to the user. In implementations, the content platform can send an offer to the user to subscribe to the composite channel. In one implementation, the content platform can refund or credit a difference in subscriber fee when automatically subscribing the user to the composite channel. In another example similar to the example above, but the composite channel has a subscriber fee of $5.99/month. The user is paying three subscriber fees of $0.99/month, the sum of which equals $3.96/month, which is less than the composite channel fee. The content platform can automatically subscribe the user to the composite channel at the price the user is currently paying ($3.96/month) and notify the user of the automatic subscription and availability of the additional component channels and premium media items.

Figure 8:
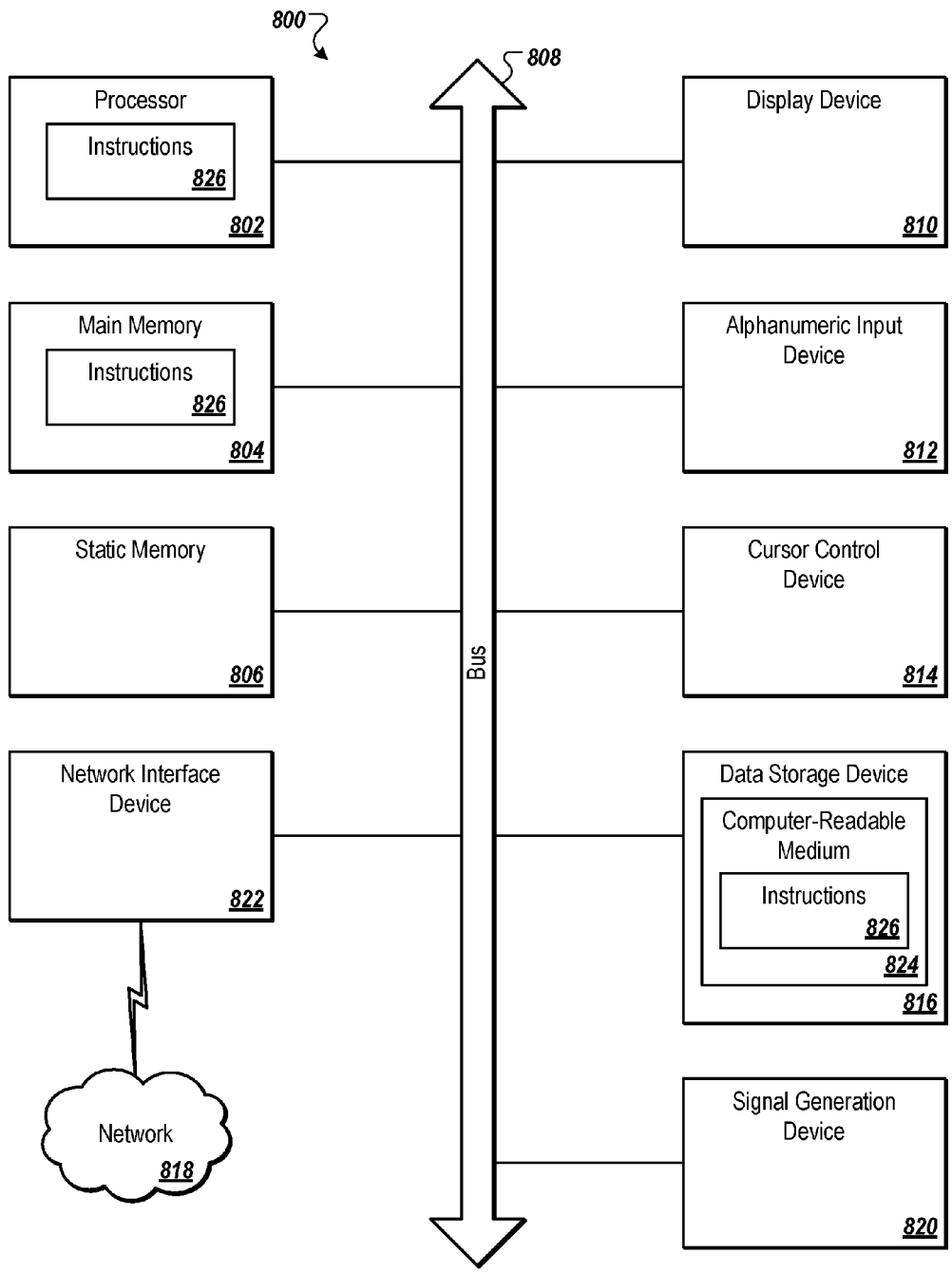
FIG. 8 is a block diagram illustrating an example computer system, according to some implementations.

FIG. 8 illustrates a diagrammatic representation of a machine in the example form of a computing device 800 within which a set of instructions, for causing the machine to perform any one or more of the methodologies discussed herein, may be executed. The computing device 800 may be a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing device 800 includes a processing device (e.g., a processor) 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)) and a data storage device 816, which communicate with each other via a bus 808.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein.

The computing device 800 may further include a network interface device 822 which may communicate with a network 818. The computing device 800 also may include a display device 810 (e.g., a liquid crystal display (LCD) or a cathode ray tube (CRT)), an alphanumeric input device 812 (e.g., a keyboard), a cursor control device 814 (e.g., a mouse) and a signal generation device 820 (e.g., a speaker). In one implementation, the display device 810, the alphanumeric input device 812, and the cursor control device 814 may be combined into a single component or device (e.g., an LCD touch screen).

The data storage device 816 may include a computer-readable storage medium 824 on which is stored one or more sets of instructions 826 (e.g., channel subscription subsystem, channel content providing subsystem, channel advertisement management subsystem, channel content access management subsystem, composite channel management subsystem) embodying any one or more of the methodologies or functions described herein. The instructions 826 may also reside, completely or at least partially, within the main memory 804 and/or within the processing device 802 during execution thereof by the computing device 800, the main memory 804 and the processing device 802 also constituting computer-readable media. The instructions may further be transmitted or received over a network 818 via the network interface device 822.

While the computer-readable storage medium 826 is shown in an example embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "subscribing," "providing," "determining," "unsubscribing," "receiving," "generating," "changing," "requesting," "creating," "uploading," "adding," "presenting," "removing," "preventing," "playing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Further, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   identifying a plurality of component channels of a content platform, wherein a component channel of the plurality of component channels comprises a plurality of media items;
   generating, by a processing device, a user interest score for each of the plurality of component channels;
   defining a composite channel comprising a subset of the plurality of component channels in view of the user interest score for each component channel in the subset of the plurality of component channels, wherein the user interest score for each component channel in the subset of the plurality of component channels exceeds a predetermined threshold;

determining a recommendation event for the composite channel; and upon detecting the recommendation event, providing a recommendation to a user to subscribe to the composite channel.

2. The method of claim 1, wherein the user interest score indicates an affinity of the user for each of the plurality of component channels.

3. The method of claim 1, wherein generating the user interest score for each of the plurality of component channels comprises determining a predicted amount of consumption of the user for each of the respective component channels within a period of time.

4. The method of claim 1, wherein the recommendation event comprises activity of the user in relation to at least one of the component channels included in the composite channel.

5. The method of claim 4, wherein the at least one of the component channels is a channel to which the user has previously subscribed.

6. The method of claim 1, wherein each of the plurality of component channels comprises an associated individual subscription price.

7. The method of claim 6, further comprising determining a composite channel subscription price that is different than a sum of each individual subscription price for each of the component channels included in the composite channel.

8. The method of claim 1, wherein the plurality of component channels comprises a first set of channels, a second set of channels, and a third set of channels, wherein defining the composite channel comprises:

selecting one channel from the first set of channels;

selecting one channel from the second set of channels; and selecting one channel from the third set of channels.

9. The method of claim 1, further comprising receiving a request from the user to subscribe to the composite channel.

10. A system, comprising:

a memory; and a processing device, coupled with the memory, to:

identify a plurality of component channels of a content platform, wherein a component channel of the plurality of component channels comprises a plurality of media items;

generate a user interest score for each of the plurality of component channels;

define a composite channel comprising a subset of the plurality of component channels in view of the user interest score for each component channel in the subset of the plurality of component channels, wherein the user interest score for each component channel in the subset of the plurality of component channels exceeds a predetermined threshold;

determine a recommendation event for the composite channel; and upon detecting the recommendation event, provide a recommendation to a user to subscribe to the composite channel.

11. The system of claim 10, wherein to generate the user interest score for each of the plurality of component channels, the processing device is to determine a predicted amount of consumption of the user for each of the respective component channels within a period of time.

12. The system of claim 10, wherein the recommendation event comprises activity of the user in relation to at least one of the component channels included in the composite channel.

13. The system of claim 10, wherein each of the plurality of component channels comprises an associated individual subscription price.

14. A non-transitory computer readable storage medium, having instructions stored therein, which when executed, cause a processing device to perform operations comprising:

identifying a plurality of component channels of a content platform, wherein a component channel of the plurality of component channels comprises a plurality of media items;

generating, by the processing device, a user interest score for each of the plurality of component channels;

defining a composite channel comprising a subset of the plurality of component channels in view of the user interest score for each component channel in the subset of the plurality of component channels, wherein the user interest score for each component channel in the subset of the plurality of component channels exceeds a predetermined threshold;

determining a recommendation event for the composite channel; and upon detecting the recommendation event, providing a recommendation to a user to subscribe to the composite channel.

15. The non-transitory computer readable storage medium of claim 14, wherein the user interest score indicates an affinity of the user for each of the plurality of component channels.

16. The non-transitory computer readable storage medium of claim 14, wherein generating the user interest score for each of the plurality of component channels comprises determining a predicted amount of consumption of the user for each of the respective component channels within a period of time.

17. The non-transitory computer readable storage medium of claim 14, wherein the recommendation event comprises activity of the user in relation to at least one of the component channels included in the composite channel.

18. The non-transitory computer readable storage medium of claim 14, wherein each of the plurality of component channels comprises an associated individual subscription price.

19. The non-transitory computer readable storage medium of claim 18, the operations further comprising determining a composite channel subscription price that is different than a sum of each individual subscription price for each of the component channels included in the composite channel.

20. The non-transitory computer readable storage medium of claim 14, wherein the plurality of component channels comprises a first set of channels, a second set of channels and a third set of channels, wherein defining the composite channel comprises:

selecting one channel from the first set of channels;

selecting one channel from the second set of channels; and selecting one channel from the third set of channels.

* * * * *